Feb. 10, 1931. J. M. GWINN, JR 1,791,497
AIRCRAFT
Filed Feb. 23, 1929
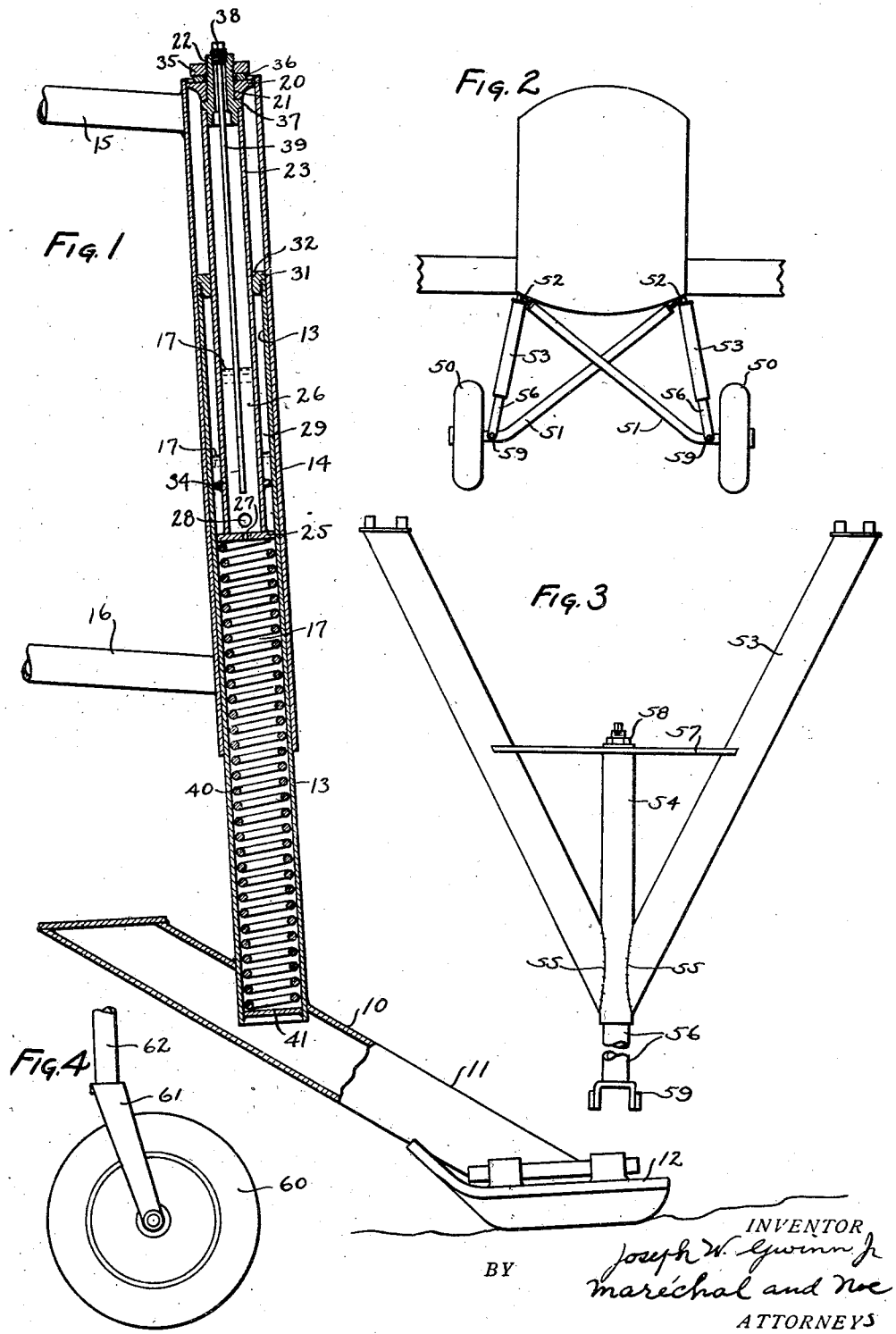
INVENTOR
Joseph W. Gwinn Jr
BY Maréchal and Noe
ATTORNEYS Patented Feb. 10, 1931

1,791,497

UNITED STATES PATENT OFFICE

JOSEPH M. GWINN, JR., OF BUFFALO, NEW YORK, ASSIGNOR TO CONSOLIDATED AIRCRAFT CORPORATION, OF BUFFALO, NEW YORK, A CORPORATION OF DELAWARE

AIRCRAFT

Application filed February 23, 1929. Serial No. 342,050.

This invention relates to aircraft and particularly to landing gear for airplanes or the like.

One object of the invention is the provision of a landing gear of this character having a plurality of telescopically related members of the hydraulic or "oleo" type, the construction being such that fine tolerances and clearances in manufacture are unnecessary to prevent the leakage of fluid.

Another object of the invention is the provision of a landing gear of the oleo type having a series of telescopically related tubes of simple construction which may be easily assembled or disassembled by connecting means of a convenient and accessible nature.

Another object of the invention is the provision of a landing gear of the character mentioned, the effective parts of the landing gear being devoid of link work or pivot pins and providing an effective construction adapted to absorb the shock of landing and provide a desirable resiliency for taxiing.

Further objects and advantages of the invention will be apparent from the following description and the accompanying drawing, in which Fig. 1 is a landing gear of the tail skid type, embodying the present invention;

Fig. 2 is a front elevation of a part of an airplane having a main landing gear or under-carriage embodying the present invention;

Fig. 3 is a side elevation of one of the landing frames shown in Fig. 2; and

Fig. 4 is a portion of a landing gear of the tail wheel type.

Referring more particularly to the drawing by reference numerals, corresponding numerals designating like parts in the various views, the landing gear embodies a landing member 10, shown as of the skid type in Fig. 1, this landing member preferably embodying a tube 11 having a suitable ground engaging runner 12 at its lower end. This skid tube 11 preferably extends at an angle downwardly and rearwardly from the lower end of the cylinder tube 13, to which it is attached as by welding or in any other suitable manner. The cylinder tube 13 contains a suitable quantity of oleo liquid 17 for absorbing the shock of landing by the squash action of a piston, and extends up into the guide tube 14 in telescopic sliding relation therewith, the outside diameter of the cylinder tube 13 approximately corresponding to the inside diameter of the guide tube 14. The guide tube 14 may form the tail post of a fuselage, being welded to the rear ends of the longerons 15 and 16 of the fuselage, as shown in Fig. 1. The various tubes of the landing gear may be made of any suitable material such as steel or light metal alloy.

At the top of the guide tube 14 is a head part 20, preferably fitting the top of the tube and welded to it, this head part having a central opening 21 through which the threaded top 22 of the piston tube 23 extends. The piston tube 23, which is welded or otherwise attached to the threaded top 22, is preferably of considerably smaller diameter than the inside diameter of the cylinder tube 13, and at the lower end of the piston tube is a piston 25 having a diameter approximately corresponding to the inside diameter of tube 13 with which it is slidably related. Preferably the piston 25 is just slightly smaller than the inside diameter of the tube 13 to provide for operating clearance for the free relative movement of these parts. As shown the piston is a metal disk welded to the bottom of the piston tube.

The piston tube 23 provides an interior space 26 which is in restricted communication with the interior of the cylinder tube 13 by means of a restricted opening 27 through the piston 25. This opening may be at the center of the piston, or the piston may be sufficiently smaller in diameter than the tube 13 to provide for a restricted flow of fluid past the outside of the piston. It will be understood that the oleo liquid 17 is contained in the cylinder tube 13 to a level near the piston 25 when the tube 13 is fully extended as in flight, so that when a load is assumed the resulting upward movement of tube 13 causes a flow of the oleo liquid through or by piston 25 and the so called "squash" action absorbs the major shock of landing without substantial rebound. The piston tube also has one or more openings 28 just above the piston 25 so that the interior of the piston tube is in restricted communication with a chamber 29 between the piston tube and the cylinder tube 13. The top of this chamber 29 is closed by a retaining nut 31. Preferably this retaining nut is threaded in the top of the cylinder tube 13 and locked in place by a removable pin or the like, nut 31 having a central passage through which the piston tube extends, the engagement between these parts being such as to permit free relative movement of the parts but permitting a very restricted passage of oleo fluid. The nut 31 preferably has a chamfered portion 32 so arranged as to provide for collection and return of the fluid which might seep from the chamber 29 to the space 33 above the retaining nut.

Near the lower end of the piston rod 23 the latter may carry a stop 34 adapted to engage the retaining nut when the cylinder tube is fully extended. This limits the downward drop of the cylinder tube to the desired extent when the aircraft is in flight, when the weight of the cylinder tube and the tail skid effect the extension of the telescopic parts. This stop, shown in the form of an annular flange on the piston tube, is preferably considerably smaller than the inside diameter of the cylinder tube so that fluid may pass from the opening 28 to the main part of the chamber 29 during the squash action of the landing gear.

The top of the piston tube 23 and its threaded top 22 are held firmly in assembled position by the nut 35 which threads on the threaded end of the part 22 and pulls the flange 37 of top 22 against the lower surface of the head part 20. A washer 36 is preferably interposed between the nut 35 and the head part 20 of the guide tube. When the nut 35 is removed it will be understood that the piston tube 23 together with the cylinder tube 13 may be withdrawn through the bottom of the guide tube, the single simple fastening means at the top of the piston tube serving to hold all of these parts in position, and permit very ready and convenient assembly or disassembly of the parts. The top of the guide tube is preferably provided somewhat above the covering of the rear of the fuselage so that the nut 35 is freely accessible without removing any of the covering or other structural parts of the fuselage. After the removal of the piston and cylinder tubes from the guide tube the retaining nut 31 may be unscrewed to disassemble the piston tube from the cylinder tube, the latter being pulled off of the piston and thus very readily separated to permit replacement, inspection or repair.

Threaded in the upper end of the top 22 of the piston tube there is preferably provided a removable plug 38 to which is centrally fixed a wire or metal ribbon 39 having a length to extend well down into the piston tube, and preferably having graduated lines or markings so that when the plug 38 is removed by unscrewing it from the threaded top 22, an indication of the level of the oleo liquid may be readily obtained. Additional oleo fluid may be added from time to time as needed through the plug opening in top 22. As shown the top of the plug 38 is square in form so that an ordinary wrench may be readily used to remove the plug when desired.

Within the cylinder tube 13 is a spring 40 having a normal extended length preferably somewhat less than the distance between the bottom of the tube 13 and the piston 25 when the cylinder tube 13 is fully extended. This spring is adapted to be engaged by the piston when a load is assumed by the landing gear, the lower end of the spring abutting against the bottom 41 of the cylinder tube. Preferably this spring 40 is not sufficiently strong to materially interfere with the effective squash action of the landing gear when the shock of landing is absorbed, but the spring is effective after the major shock of landing is absorbed in taxying over the ground to yieldingly support the rear end of the fuselage, the spring at that time effectively absorbing minor shocks in a resilient manner and operating under compression due to the downward force on the piston. Obviously this spring need not necessarily be employed, and if omitted the shock of landing will be absorbed effectively by the squash action of the landing gear.

It will be understood that when a shock of landing is assumed, the cylinder tube 13 is forced upwardly from its full extended position, and the piston 25 being stationary with respect to the aircraft, there will be a restricted flow of fluid through the opening 27 in the piston which effectively absorbs the major shock of landing without rebound. The liquid which travels up through the opening 27 partially fills the interior of the piston tube, which is of considerable size so as to hold a large part of the liquid thus forced up through or bypassing the piston. Some of the fluid flowing up into the piston passes out through the opening or openings 28 and partially fills the chamber 29 around the piston tube. There may be some seepage of the liquid from the chamber 29 along the outside of the piston tube bypassing the retaining nut 31 so that some of the fluid reaches the space 33 above the retaining nut outside of the piston tube. This leakage of fluid past the retaining nut provides for effective lubrication of the outside of the cylinder tube where it is telescopically engaged with the guide tube 14. However due to the substantial area of engagement between these tubes practically no fluid is lost through the lower end of the guide tube, excess fluid reaching the space 33 finding its way back into the chamber 29 by reason of the chamfered part 32 of the retaining nut. It is thus apparent that none of the moving connections of the landing gear need be made particularly fluid tight; in fact some seepage or leakage of the liquid is desirable so that the parts will be properly lubricated. No fine tolerances, smooth finishes, or ground surfaces are therefore necessary in machining the various parts, and this permits a cheap construction while giving completely satisfactory operation without loss of liquid.

As the cylinder tube 13 is not restricted against movement about its longitudinal axis in the guide tube 14, the skid tube 11 may swing about the longitudinal axis of the landing gear assembly to permit the proper trailing effect of the runner 12. This permits the desired movement of the skid tube 11 without employing pivot pins or link work. The reenforcement of the part of the cylinder tube 13 with which the piston cooperates by the enclosing guide tube effectively resists all bending forces, and there is thus no great tendency of the piston 25 to wear as it moves relatively to the cylinder tube 13.

The landing gear of the present invention is equally applicable to under-carriages or main landing gears of aircraft. As shown in Fig. 2 the main landing wheels 50 are carried by the axles 51 which are pivoted at 52 to the fuselage. Upward movement of the wheels during landing is permitted by the V frames 53 which are pivotally connected at their upper ends to suitable hinge pins on the fuselage. Each V frame 53 carries a guide tube 54, being preferably welded thereto as indicated at 55. This guide tube 54, and the cylinder tube 56 which is telescopically related to it are similar in construction to the guide tube 14 and the cylinder tube 13 of Fig. 1. The upper end of the guide tube 54 is shown connected by a fairing support 57 to intermediate portions of the V frame. The nut 58 which threads on the threaded top of the piston tube is here shown engaging the top of the guide tube 54. The cylinder tube 56 is provided with a fork 59 which is attached by means of a suitable pin connection to the axle 51 as shown. It will thus be apparent that the major shocks of landing will effectively be absorbed by the squash action of the landing gear as cylinder tube 56 is moved up into the guide tube 54 from its fully extended position. After landing and while taxiing on the ground the spring within the cylinder tube 56 absorbs minor shocks in a resilient manner.

Fig. 4 shows a ground wheel 60 which is rotatably carried by the fork 61 fixed to the lower end of a tube 62. This tube 62 may be similar in construction to the cylinder tube 13 of Fig. 1 where it is desired to provide a wheel support, tube 61 being similar in construction to the cylinder tube 13 and adapted to cooperate with telescoping guide and piston tubes such as have been previously described.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A landing gear for aircraft comprising a landing member, a tube supporting said member, a guide tube mounted on the aircraft and telescopically related to said first tube, a piston cooperating with said first tube, a piston supporting member, and a single connection at the upper end of piston supporting member for holding said member to an upper portion of said guide tube, said member, piston, and first tube being removable through the lower end of said guide tube when said single connection is released, and liquid damping means in said first tube.

2. A landing gear for aircraft comprising a landing member, a tube supporting said member, a second tube telescopically related to said first tube, a piston in said tubes, a hollow piston tube for said piston, a closing member closing the top of said piston tube, means carried by the top of said second tube detachably supporting said closing member, and liquid damping means in said first tube.

3. A landing gear for aircraft comprising a landing member, a tube supporting said member, a second tube telescopically related to said first tube, a piston in said tubes, a hollow piston tube for said piston, a closing member closing the top of said piston tube, means carried by the top of said second tube detachably supporting said closing member, and liquid damping means in said first tube, said tubes having plurality of chamber spaces to which the liquid may flow from the said first tube before reaching the said second tube.

4. A landing gear for aircraft comprising a landing member, a tube supporting said member, a guide tube in which said first tube is telescopically slidable, a piston tube extending downwardly from the upper end of said guide tube and having a piston slidable in said first tube and providing a chamber between said piston tube and said first tube, means closing the upper end of said chamber, and means for detachably mounting said piston tube on said guide tube.

5. A landing gear for aircraft comprising a landing member, a tube supporting said member, a guide tube in which said first tube is telescopically slidable, a piston tube having a piston at its lower end slidably mounted within said first tube, said piston tube having a diameter substantially smaller than the diameter of said first tube to provide a chamber externally of said piston tube, means at the upper end of said first tube for closing the upper end of said chamber, and a nut in threaded engagement with the top of said piston tube securing said piston tube to the top of said guide tube, and liquid damping means in said first tube.

6. A landing gear for aircraft comprising a landing member, a tube supporting said member, a guide tube in which said first tube is telescopically slidable, a piston tube having a piston at its lower end slidably mounted in said first tube, said piston having an opening providing restricted communication between the interior of said piston tube and said first tube, said piston tube having an opening providing restricted communication between the interior of said piston tube and the space above the piston, a single connection at the upper end of said piston tube for holding said piston tube to the top of said guide tube, said piston tube, piston, and first tube being removable through the lower end of said guide tube when said means is released.

7. A landing gear for aircraft comprising a landing member, a tube supporting said member, a guide tube in which said first tube is telescopically slidable, a piston tube fixed at its upper end to said guide tube and having a piston at its lower end slidable in said first tube, means in threaded engagement with the top of said first tube and having an opening through which said piston tube extends, said means and said piston providing a chamber between said piston tube and said first tube, liquid damping means in said first tube, and means providing restricted communication between said first tube, said piston tube, and said chamber.

8. A landing gear for aircraft comprising a landing member, a tube supporting said member, a guide tube in which said first tube is telescopically slidable, a piston tube of smaller diameter than said first tube, a piston at the lower end of said piston tube slidable in said first tube, a retaining nut threaded on the upper end of said first tube and surrounding said piston tube, a head part at the upper end of said guide tube, said piston tube having a threaded top extending through said head part, threaded means engaging therewith for securing said piston tube to said head part, a spring in said first tube adapted to be compressed by said piston when a load is assumed by said landing gear, said piston and piston tube having means providing restricted communication between the interior of said first tube, said piston tube, and the space around said piston tube, the arrangement being such that the piston tube and said first tube may be withdrawn through the lower end of said guide tube when said threaded means is removed.

9. In an airplane, an empennage frame embodying upper and lower longitudinal members, an upwardly extending hollow tube fixed to said members and forming the tail post of the empennage, means telescopically supported within said hollow tube and projecting downwardly therefrom and freely supported for rotational movements about the axis of said tube, and a landing member mounted on the lower end of said means.

10. In an airplane, an empennage comprising rearwardly extending upper and lower longitudinal members, a downwardly extending hollow tube connected to said members and forming the tail post, a landing member, a supporting tube supporting said landing member and telescopically received in said hollow tube, a piston within said tubes, a piston supporting member extending upwardly from said piston, and releasable means at the upper end of said tail post and freely accessible at a point above the upper longitudinal member of the empennage for mounting said piston supporting member in place.

11. In an airplane, longitudinally extending empennage members, a hollow tube connected to said members and forming a tail post, a ground engaging landing member, and a tube connected to said landing member and mounted for up and down and rotational movements in said hollow tube.

In testimony whereof I hereto affix my signature.

JOSEPH M. GWINN, Jr.